(12) United States Patent
Canaday et al.

(10) Patent No.: US 9,038,291 B2
(45) Date of Patent: May 26, 2015

(54) POPUP DISPLAYS FOR FINANCIAL TRANSACTION CARDS

(71) Applicant: Homer TLC, Inc., Wilmington, DE (US)

(72) Inventors: Jessica Canaday, Smyrna, GA (US); Nichole Flynn, Park Ridge, IL (US)

(73) Assignee: Homer TLC, Inc., Wilmington, DE (US)

( * ) Notice: Subject to any disclaimer, the term of this patent is extended or adjusted under 35 U.S.C. 154(b) by 63 days.

(21) Appl. No.: 13/839,134

(22) Filed: Mar. 15, 2013

(65) Prior Publication Data

US 2014/0150307 A1     Jun. 5, 2014

Related U.S. Application Data

(60) Provisional application No. 61/732,705, filed on Dec. 3, 2012.

(51) Int. Cl.
| | | |
|---|---|---|
| *G09F 1/00* | (2006.01) | |
| *B42D 15/02* | (2006.01) | |
| *B42D 15/04* | (2006.01) | |

(52) U.S. Cl.
CPC ............ *B42D 15/022* (2013.01); *B42D 15/045* (2013.01)

(58) Field of Classification Search
CPC .... G09F 27/00; B42D 15/022; B42D 15/042; B42D 15/045
USPC .................................................... 40/124.14
See application file for complete search history.

(56) References Cited

U.S. PATENT DOCUMENTS

| | | | | |
|---|---|---|---|---|
| 3,235,988 | A * | 2/1966 | Paige ........................ | 40/124.08 |
| 4,531,319 | A * | 7/1985 | Saxton ............................. | 40/539 |
| 5,562,520 | A * | 10/1996 | Pridonoff et al. ............. | 446/148 |
| 5,626,232 | A * | 5/1997 | Volkert et al. ................. | 206/768 |
| 5,671,555 | A * | 9/1997 | Fernandes ................. | 40/124.03 |
| 5,799,424 | A * | 9/1998 | Volkert et al. ............. | 40/124.08 |
| 5,864,973 | A * | 2/1999 | Cole ......................... | 40/124.09 |
| 6,044,490 | A * | 4/2000 | Volkert et al. ....................... | 2/12 |
| 6,148,173 | A * | 11/2000 | Bell .............................. | 434/309 |
| 6,199,308 | B1 * | 3/2001 | Westendorp ............... | 40/124.08 |
| 6,367,180 | B2 * | 4/2002 | Weiss et al. ..................... | 40/580 |
| 6,536,145 | B2 * | 3/2003 | Burtch et al. .............. | 40/124.08 |
| 7,584,558 | B2 * | 9/2009 | Boyd et al. ................ | 40/124.08 |
| 7,717,347 | B2 * | 5/2010 | Boyd et al. .................... | 235/487 |
| 7,938,270 | B2 * | 5/2011 | Davis .......................... | 206/768 |
| 8,615,910 | B2 * | 12/2013 | Glass et al. .............. | 40/124.08 |
| 8,646,606 | B2 * | 2/2014 | Glass et al. .................. | 206/449 |
| 8,695,242 | B2 * | 4/2014 | Nelson ...................... | 40/124.03 |
| 8,701,315 | B2 * | 4/2014 | Glass et al. .............. | 40/124.06 |
| 2008/0149709 | A1 * | 6/2008 | Boyd et al. .................... | 235/380 |
| 2008/0149727 | A1 * | 6/2008 | Boyd et al. .................... | 235/487 |
| 2010/0170822 | A1 * | 7/2010 | Davis ........................... | 206/486 |
| 2012/0285861 | A1 * | 11/2012 | Glass et al. .................. | 206/768 |
| 2013/0067780 | A1 * | 3/2013 | Glass et al. .............. | 40/124.06 |
| 2013/0302540 | A1 * | 11/2013 | Vinecombe ..................... | 428/12 |
| 2014/0033583 | A1 * | 2/2014 | Larson et al. ............. | 40/124.03 |

* cited by examiner

*Primary Examiner* — Shin Kim
(74) *Attorney, Agent, or Firm* — Norton Rose Fulbright US LLP (57) ABSTRACT

Foldable financial transaction card displays that include at least one popup member, methods of making such displays, and methods of promoting such displays. Some of the displays include folding members that are unitary with the popup members.

13 Claims, 5 Drawing Sheets

POPUP DISPLAYS FOR FINANCIAL TRANSACTION CARDS

CROSS REFERENCE TO RELATED APPLICATIONS

This application claims the priority benefit of U.S. Application Ser. No. 61/732,705, filed Dec. 3, 2012, which is specifically incorporated by reference in its entirety without disclaimer.

BACKGROUND

1. Field of the Invention

The present invention relates generally to displays for gift cards or other financial transactions cards, and more particularly, but not by way of limitation, to displays that include at least one popup member, to methods of making such displays, and to methods of promoting such displays.

SUMMARY

Some embodiments of the displays include a folding member, which may be characterized as a cover, that includes one or more popup members and three-dimensional members that are all formed from the same piece of material. In such embodiments, the members may be characterized as unitary with at least respective portions of the cover.

For example, some embodiments of the displays comprise a foldable financial transaction card display that includes a folding member configured to fold about a fold line between an open position and a closed position; a first popup member unitary with at least a portion of the folding member and configured to transition between a collapsed position when the folding member is in the closed position and an extended position when the folding member is in the open position; and a financial transaction card removably coupled to the first popup member. The first popup member may have an open region, and the display may also include a second popup member unitary with at least a portion of the folding member, the second popup member configured to transition between a collapsed position when the folding member is in a closed position and an extended position when the folding member is in the open position, the second popup member extending through the open region of the first popup member when the folding member is in the open position (meaning that one portion of the second popup member is on one side of the open region of the first popup member and another portion of the second popup member is on another side of the open region of the first popup member when the members are in extended positions). In some embodiments, the display is configured so that when the first and second popup members transition from their respective collapsed positions to respectively extended positions, a majority of the second popup member extends through the open region in the first popup member. In some embodiments, when the first and second popup members are in their respective collapsed positions, no portion of the second popup member extends through the open region of the first popup member. In some embodiments, the open region of the first popup member is an elongated slot that is longer than it is wide, such as more than 2 times in some embodiments, more than 5 times in some embodiments, more than 10 times in some embodiments, and more than 20 times in some embodiments, and the length of the slot is 10 inches or less, 8 inches or less, 6 inches or less, or 4 inches or less. In some embodiments, the financial transaction card is removably coupled to the first popup member such that when the first and second popup members are in their respective extended positions, the card and the second popup member are in respective positions that are synergistically-related. In some embodiments, the collapsed position of at least one popup member is one in which the popup member is relatively flat and unfolded (except for a fold along the fold line where the popup member is unitary with the folding member), and the collapsed position of at least another of the popup members is one in which that popup member is relatively flat and different portions of that popup member are folded about fold lines of that popup member other than the fold line where the popup member is unitary with the folding member. The popup members may be shaped and/or include indicia (or otherwise configured) to resemble different portions of a tool, such as the first popup member being configured in shape and/or appearance as at least a mitre saw table and the second popup member being configured in shape and/or appearance as at least a mitre saw blade. The display may also include a financial transaction card (such as a gift card) removably coupled to one of the popup members, such as the first popup member. The folding member may comprise two panels, the fold line of the folding member defining the inside longitudinal edge of each, and the folding member is configured such that the panels substantially face each other when the folding member is in the closed position, and such that the panels are substantially co-planar (and face the same direction) when the folding member is in the open position. The display may be configured so that when the folding member is in the closed position, the financial transaction card is in a collapsed position that is relatively flat, and so that when the folding member is in the open position, the financial transaction card is in a plane oriented substantially parallel to the plane in which the panels are substantially oriented.

Some embodiments of the displays include a folding member configured to fold about a fold line between an open position and a closed position; a first popup member coupled to the folding member and configured to transition between a collapsed position when the folding member is in the closed position and an extended position when the folding member is in the open position; a second popup member coupled to the folding member, the second popup member configured to transition between a collapsed position when the folding member is in a closed position and an extended position when the folding member is in the open position; and a financial transaction card removably coupled to the first popup member. In some embodiments, the financial transaction card is removably coupled to the first popup member such that when the first and second popup members are in their respective extended positions, the card and the second popup member are in respective positions that are synergistically-related. In some embodiments, the first and second popup members are configured in shape and/or appearance as different parts of the same tool, such as, for example, the first popup member being configured in shape and/or appearance as at least a table of a mitre saw (such as a sliding compound mitre saw) and the second popup member being configured in shape and/or appearance as at least a blade of the mitre saw. In some embodiments, the first popup member has an open region and the display is configured such that the second popup member extends through the open region of the first popup member when the folding member is in the open position. In some embodiments, the display is configured so that when the first and second popup members transition from their respective collapsed positions to respectively extended positions, a majority of the second popup member extends through the open region in the first popup member. In some embodiments, when the first and second popup members are in their respective collapsed positions, no portion of the second popup member extends through the open region of the first popup member. In some embodiments, the open region of the first popup member is an elongated slot that is longer than it is wide, such as more than 2 times in some embodiments, more than 5 times in some embodiments, more than 10 times in some embodiments, and more than 20 times in some embodiments, and the length of the slot is 10 inches or less, 8 inches or less, 6 inches or less, or 4 inches or less. In some embodiments, the display also includes a sensor configured to send a signal indicative of a transition from the closed position to the open position; and an audio playback device coupled to the sensor, the audio playback device configured to play at least one pre-recorded audio segment in response to the signal. In some embodiments, the audio segment is related to the first and/or second popup members, and may include a sound or sounds that correspond to a sound or sounds that actual versions of the first and/or second popup members would make in use. For example, where the first and second popup members are configured in shape and/or appearance as portions of a mitre saw, the audio segment may play sounds an actual mitre saw would make. In some embodiments, the sounds may be part or all of a song or tune, such as one that is related to a time of year or season during which the display is marketed and/or sold.

Some embodiments of the methods include methods of manufacturing, or creating, a foldable financial transaction card display, where the methods include forming a unitary sheet (such as through cutting or stamping, and which may include the creation of fold lines, such as through perforating and/or bending); manipulating the unitary sheet to define the display, where the display comprises: a folding member configured to fold about a fold line between an open position and a closed position; and a first popup member unitary with at least a portion of the folding member and configured to transition between a collapsed position when the folding member is in the closed position and an extended position when the folding member is in the open position; and removably coupling a financial transaction card to the first popup member. The displays of such embodiments may include any of the features recited throughout this disclosure pertaining to the display configurations involving a unitary folding member and popup/3D members.

Some embodiments of the methods include methods of promoting a financial transaction card (such as for sale or use), where the methods include obtaining a financial transaction card display, the financial transaction card display comprising a financial transaction card removably coupled to a unitary popup card, the unitary popup card comprising a folding member configured to fold about a fold line between an open position and a closed position, and a first popup member unitary with at least a portion of the folding member and configured to transition between a collapsed position when the folding member is in the closed position and an extended position when the folding member is in the open position; and displaying the display to a potential customer. The displays of such embodiments may include any of the features recited throughout this disclosure pertaining to the display configurations involving a unitary folding member and popup/3D members. In some embodiments, the unitary popup card comprises indicia configured to notify a potential customer that the display contains a popup member.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a display or a component of a display that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Further, a structure (e.g., a component of a display) that is configured in a certain way is configured in at least that way, but it can also be configured in other ways than those specifically described.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Any embodiment of any of the displays and methods can consist of or consist essentially of—rather than comprise/include/contain/have—any of the described elements and/or features or steps. Thus, in any of the claims, the term "consisting of" or "consisting essentially of" can be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The display and its components shown in the figures, except for the diagram in FIG. 5, are drawn substantially to scale.

DETAILED DESCRIPTION OF ILLUSTRATIVE EMBODIMENTS

Figure 1:
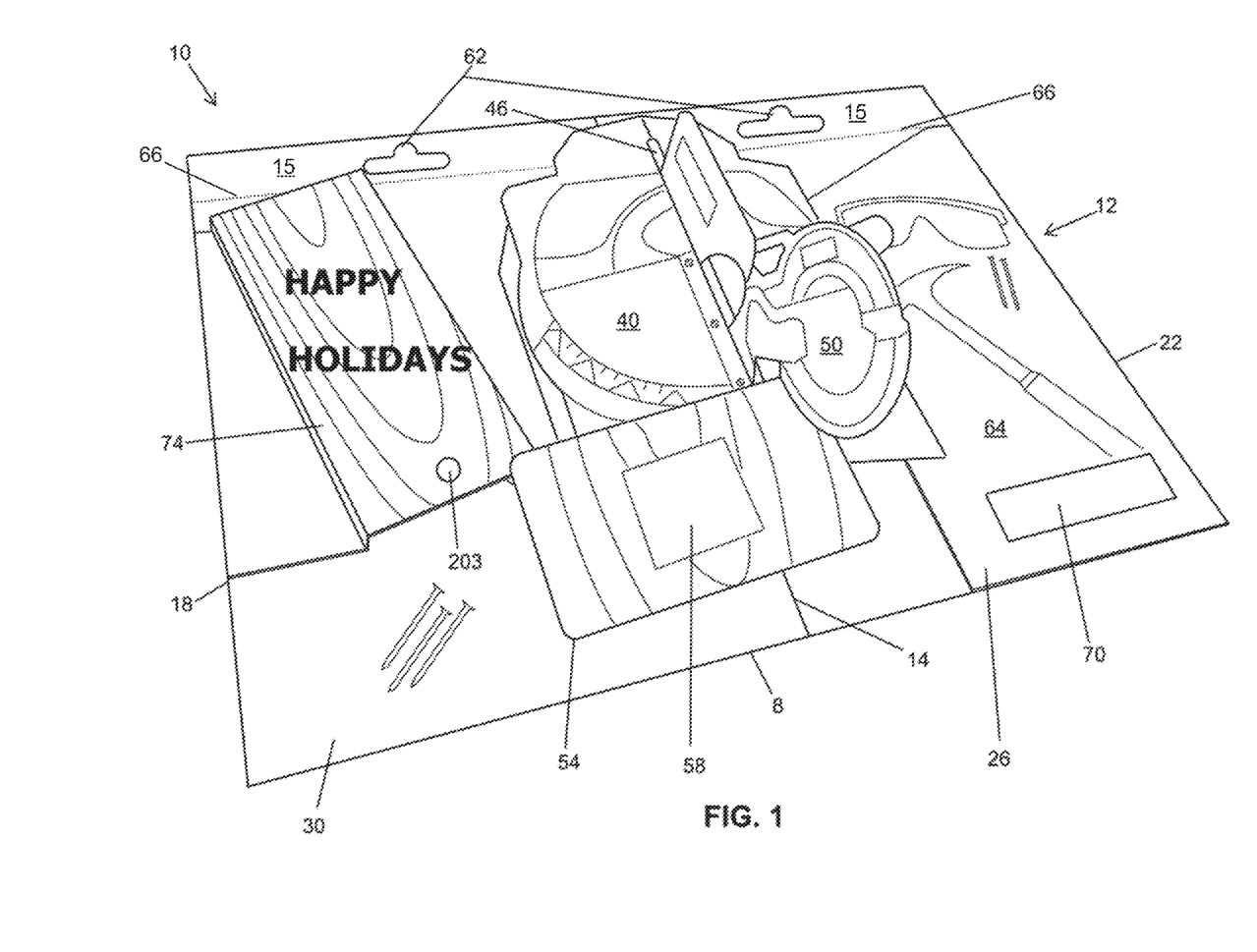
FIG. 1 shows a perspective view of a foldable financial transaction card display arranged in an open position, according to one embodiment of the foldable financial transaction card displays. This position shows the two panels of the folding member, or cover, in a substantially co-planar arrangement.
Figure 2:
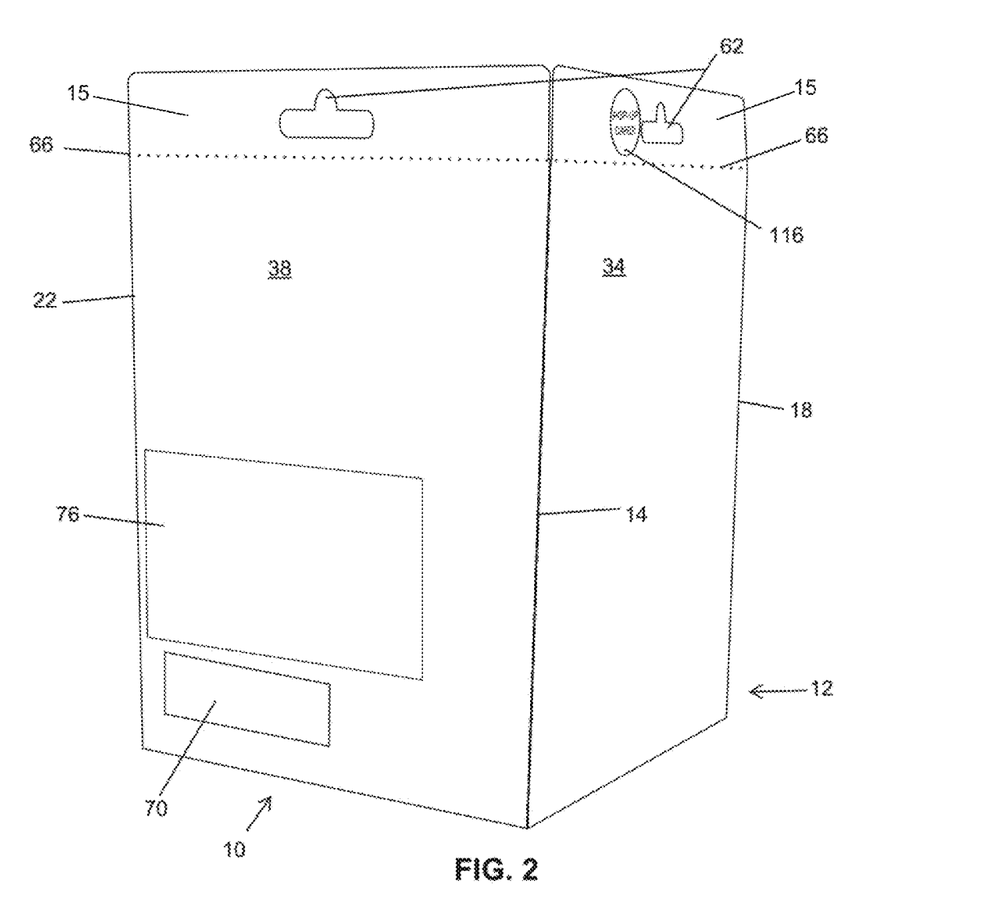
FIG. 2 shows a perspective view of the back of the display shown in FIG. 1 in a partially closed position.

Referring now to the drawings, and more particularly to FIG. 1 and FIG. 2, shown there is foldable financial transaction card display 10, according to one embodiment of the foldable financial transaction card displays. Display 10 includes a folding member (e.g., cover) 12, which is one embodiment of a folding member configured to fold about a fold line (e.g., fold line 14) between an open position and a closed position. FIG. 1 depicts cover 12 in an open position, while FIG. 2 depicts cover 12 (from the back) in a partially closed position.

Folding cover 12 comprises two panels 18 and 22, which are unitary in the depicted embodiment. Each panel has a pair of opposing sides. Sides 30 and 26 of panels 18 and 22, respectively, can be seen in FIG. 1; opposing sides 34 and 38, on the backs of panels 18 and 22, respectively, can be seen in FIG. 2. When display 10, and more specifically cover 12, is moved from an open position into a closed or partially closed position, interior sides 26, 30 face each other to some degree while exterior sides 34, 38 face away from each other to some degree.

Display 10 includes first popup member 40, which extends away from folding cover 12 when the cover is in an open position. More specifically, display 10 is configured such that first popup member 40 is in an extended position when cover 12 is an open position, and, in that extended position, one portion of first popup member 40 extends away from side 26 and another portion of first popup member 40 extends away from side 30. First popup member 40 is configured to be in a collapsed position when cover 12 is in a closed position.

Display 10 also includes second popup member 50. As shown in the depicted embodiment, first popup member 40 may include an open region (such as opening 46) through which second popup member 50 may extend when cover 12 is in an open position and both first and second popup members 40 and 50 are in extended positions. When cover 12 is in a closed position, second popup member 50 is in a collapsed position. Display 10 is configured such that second popup member 50 extends away from one or both of the sides of cover 12; in the depicted embodiment, display 10 is configured such that second popup member 50 extends away from side 26 of cover 12 when cover 12 is in an open position. Even more specifically, display 10 is configured such that second popup member 50 extends through opening 46 in first popup member 40 (as shown in FIG. 1) when cover 12 is in an open position. While the open region of first popup member 40 through which second popup member 50 may extend is configured as opening 46 in the depicted embodiment, in other embodiments of the displays, the open region may comprise a cutout (such as a slot) that is not, unlike opening 46, completely bounded by first popup material but that is configured, like opening 46, such that second popup member 50 can extend through it when cover 12 is in an open position and first and second popup members 40 and 50 are in extended positions. In the form depicted in FIG. 1, opening 46 is an elongated slot that is longer than it is wide, such as at least 2 to 10 times (or more), and the length of the slot is 10 inches or less, such as 6 inches or less.

Display 10 is configured so that when first and second popup members 40 and 50 transition from their respective collapsed positions to their respective extended positions shown in FIG. 1, a majority of second popup member 50 (such as a majority of the area of second popup member 50, a majority of the height (from the flat surface of open cover 12) of second popup member 50, or a majority of the length of popup member 50) extends through opening 46 in first popup member 40, meaning the majority of second popup member 50 transitions from being one side of opening 46 to the other side. Furthermore, display 10 is configured such that when first and second popup members 40 and 50 are in their respective collapsed positions, no portion of second popup member 50 extends through opening 46 of first popup member 40. Display 10 is configured such that when first and second popup members 40 and 50 transition from their respective collapsed positions to their respective extended positions shown in FIG. 1, a top portion of second popup member 50 (such as, in the depicted embodiment, the portion of the blade of the mitre saw that is the greatest distance from the surface of open cover 12) extends through opening 46 in first popup member 40, meaning that the top portion (though not necessarily all locations in the top portion) of second popup member 50 transitions from being one side of opening 46 to the other side.

Some embodiments of the displays, such as display 10, also comprise other popup or three-dimensional members. For example, display 10 includes three-dimensional member 74, which extends outward from side 30 and, more generally, from panel 18 and, even more generally, from cover 12. The term unitary popup card may be used to refer to a cover and any popup and/or three-dimensional members that are part of the same, unbroken piece of material, such as cover 12, popup members 40 and 50, and three-dimensional member 74 illustrated in FIGS. 1 and 2. The material may be formed as a sheet, through, for example, cutting or stamping, or may, for example, be extruded or molded. Two items are not unitary if they were originally separate from and unconnected to each other and later joined together gluing, taping, stapling, fastening, or the like.

Display 10 also includes financial transaction card 54, which is enclosed in cover 12 when cover 12 is in a closed position. One form of financial transaction card 54 is a gift card. More specifically, as shown in the depicted embodiment, card 54 may be coupled to one of the members of display 10, such as first popup member 40. One location at which card 54 can be coupled to first popup member 40 is coupling junction 42, shown in FIG. 3. In other embodiments, financial transaction card 54 may be coupled to second popup member 50. In the depicted embodiment, financial transaction card 54 is removably coupled to first popup member 40 with a removable elastic adhesive (e.g., "fugitive" glue) that couples card 54 to first popup member 40 but allows card 54, and the glue itself, to be easily removed without leaving a residue. Other substances, including other satisfactory adhesives, and materials like tape may be used in other embodiments for the same purpose. In the depicted embodiment, display 10 is configured such that card 54 will be positioned between at least a portion of first popup member 40 and cover 12 (more specifically panel 18) when cover 12 is in an open position. Display 10 is also configured such that card 54 will be positioned between at least a portion of second popup member 50 and at least a portion of first popup member 40 when second popup member 50 is extended through opening 46 in first popup member 40, as shown in FIG. 1.

In still other embodiments, non-adhesive couplers can be used to couple the card to a popup member. For example, the card may be coupled to a popup member by disposing the card underneath one or more tabs cut into the popup member, or with one or more brackets, or with one or more magnets, to name a few. In other embodiments of the displays, financial transaction card 54 may be coupled in a non-removable fashion to a popup or other member (such that de-coupling the card from the member damages one or both in a non-insignificant way). In other embodiments of the displays, card 54 may be enclosed in cover 12 and unitary with a portion of the material from which cover 12 is formed. For example, in some embodiments, at least one popup member may comprise at least one (up to all) elements of a financial transaction card.

Card 54 is coupled to first popup member 40 such that when first popup member 40 is in an extended position and second popup member 50 is in an extended position, a pre-determined portion of card 54 (such as transparent portion 104 shown in FIG. 4A) is in a specific position relative to a pre-determined portion of second popup member 50, such as the blade portion of second popup member 50 being aligned over transparent portion 104 of card 54, which transparent portion symbolizes a cut in card 54. This arrangement creates a synergistic effect between the two pre-determined portions and/or between second popup member 50, card 54, and first popup member 40. Even more specifically, card 54 is coupled to first popup member 40 and first popup member 40 and second popup member 50 are coupled to or unitary with cover 12 such that when first popup member 40 is in an extended position and second popup member 50 is in an extended position, and second popup member 50 extends through opening 46 in first popup member 40, a pre-determined portion of card 54 is in a specific position relative to a pre-determined portion of second popup member 50, such as the blade portion of second popup member 50 being aligned over transparent portion 104 of card 54.

Card 54 and/or cover 12 may also have printing disposed on one or more of its surfaces to give it an aesthetic or themed appearance, to reflect branding, to inform customers of legal aspects of financial transaction card 54 (such as in location 76 illustrated in FIG. 2), or for any other purpose. Cover 12 includes indicia 116, which reads "POP-UP CARD!" and is an example of indicia configured to notify a potential customer that the display contains a popup member.

Some embodiments of the displays, such as display 10, are configured to be showcased, or displayed, such as in a retail establishment, on a rack or other fixture. For example, display 10 includes multiple display-supporting regions 15 coupled to panels 18 and 22, respectively. Each region 15 comprises (e.g., hanger-shaped) openings 62 to allow display 10 to be hung on a rod or hook, such as a retail fixture hook. The panels of some embodiments of the displays, such as display 10, may include tear lines 66 (e.g., perforated tear lines), which allow display-supporting regions 15 to be removed or de-coupled from cover 12 (and more specifically from panels 18 and 22), such as for aesthetic purposes and such that the display no longer includes those regions (and, therefore, in the depicted embodiment, openings 62). In other embodiments of the displays, display-supporting regions 15 may comprise a tab with an opening (such as one shaped like opening 62) and may be coupled (e.g., with an adhesive, a staple, or the like) to cover 12 (e.g., via at least one of panels 18 and 22), such that the tab extends above the top edge of cover 12, allowing cover 12 (and, therefore, display 10) to be showcased, or displayed, in the same manner as display 10. While display-supporting regions 15 of cover 12 comprise openings 62, in other embodiments of the displays that include one or more display-supporting regions, the region(s) may comprise a cutout (such as a slot) that is not completely bounded by display-supporting region material (as is opening 62) but that is configured, like opening 62, to allow the cover to be displayed by hanging it from a rod or similar structure. Such a cutout could comprise a shape like opening 62 but could also include a channel extending to the top edge of the display-supporting region. Such a shape would allow someone to hang the display on a rod by positioning the display under the rod and pushing the display up, so that the rod drops into the channel from above, and over, so that the top edge of another portion of the cutout rests on top of the rod.

Some embodiments of the displays, such as display 10, include a convenience feature configured to allow retail processing of the display—such as activation of the display and, more specifically, its financial transaction card—when cover 12 is in a closed position. For example, display 10 comprises an open region, such as window 70. More specifically, panel 22 of cover 12 of display 10 includes an open region, such as window 70. Display 10 is, therefore, configured such that a portion or portions of financial transaction card 54 (such as identifier 100) can be accessed through the open region (e.g., window 70) when cover 12 is in a closed position. This configuration is achieved, at least in part, through the configuration of first popup member 40, the configuration of card 54, the manner in which card 54 is coupled to first popup member 40, and the configuration (e.g., size and location) of the open region (e.g., window 70). In other embodiments, the open region may comprise a cutout (such as a slot) that is not completely bounded by display material (and, more specifically, cover material; and, even more specifically, panel material) but that is configured, like window 70, such that a portion or portions of financial transaction card 54 (such as identifier 100) can be accessed through the open region when cover 12 is in a closed position.

Figure 3:
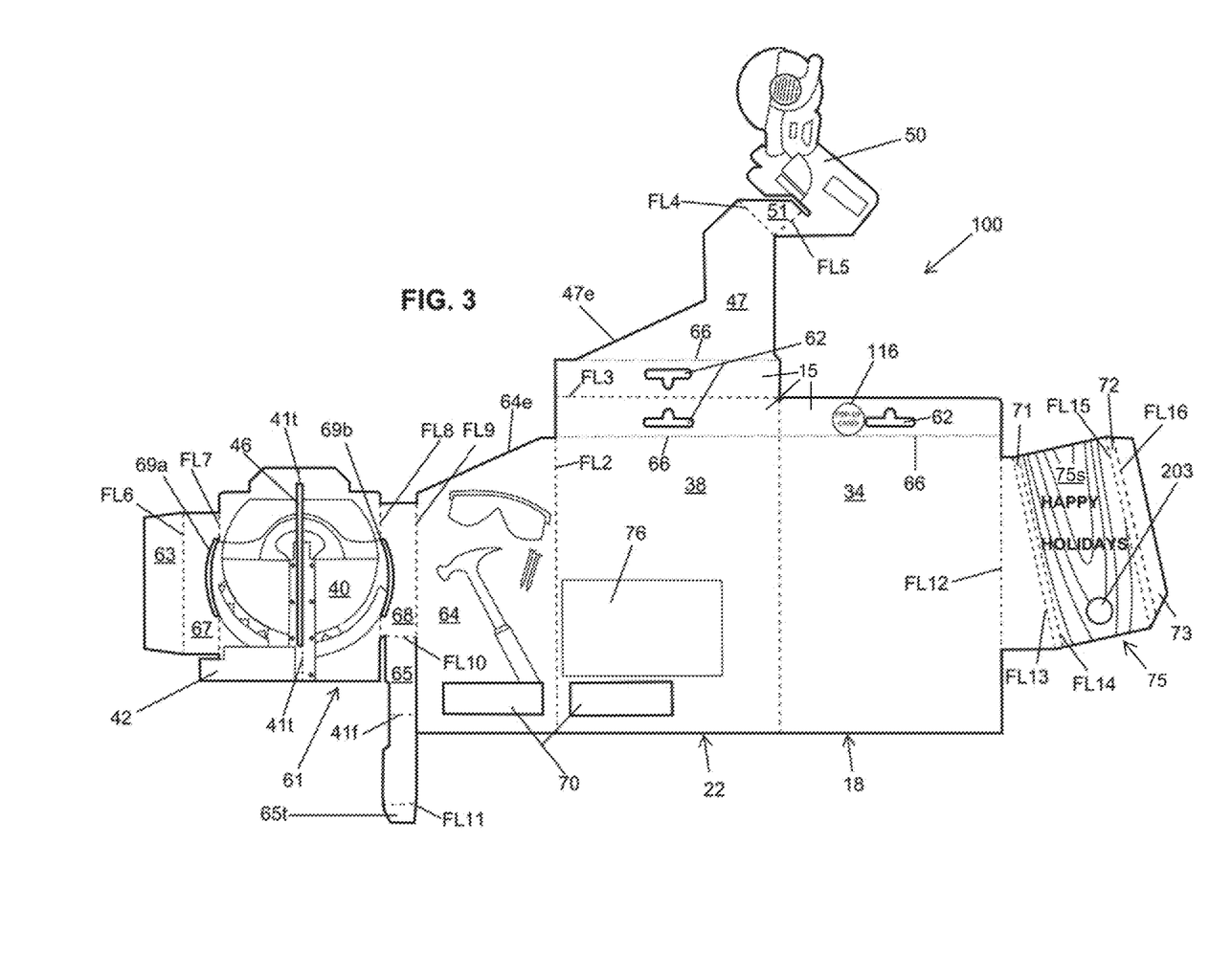
FIG. 3 shows a view of a unitary sheet of card material formed into a shape capable of being manipulated to define the display shown in FIGS. 1 and 2.

In the embodiment of the displays depicted in FIGS. 1-3, first and second popup members 40 and 50, and three-dimensional member 74, are unitary with cover 12. This is shown most clearly in FIG. 3, which shows unitary stock 100, which is a piece of card material that has been cut into a shape capable of being folded. Portions of the card material can be coupled to other portions to define foldable financial transaction card display 10. Stock 100 is configured with multiple segments that can be folded to form side 26 of panel 22 of cover 10. In particular, segment 64, which is unitary with panel 22 (meaning segment 64 and panel 22 are different portions of the same piece of material (stock 100)), may be folded about fold line FL2 (away from the viewer of FIG. 3) so that the side of segment 64 containing the graphics shown in FIG. 3 forms part of front side 26 of panel 22 (as shown in FIG. 1). Stock 100 also includes second popup member connector segment 47, which is unitary with panel 22 and which may be folded about fold line FL3 (away from the viewer of FIG. 3) so that the visible side of segment 47 forms part of front side 26 of panel 22 (as shown in FIG. 1). Segment 64 has an edge 64e that is oriented at an angle so as to match the angle of edge 47e of second popup member connected segment 47 when the two segments are folded and forming portions of front side 26, as shown (but not numbered) in FIG. 1. Second popup member 50 is part of segment 51, which is unitary with second popup member connected segment 47 and also with panel 22. Segment 51 is foldable about fold line FL4 and second popup member 50 is foldable about fold line FL5 so that second popup member 50 can extend up through opening 46 in first popup member 40 when cover 12 is in an open position.

Stock 100 also includes segment 61, which is unitary with segment 64 and therefore also with panel 22. Segment 61 is configured to form first popup member 40, and includes left side segment 67 bounded in part by fold lines FL6 and FL7 and right side segment 68 bounded in part by fold lines FL8 and FL9. Segment 61 includes openings 69a and 69b, which allow the portion of segment 61 and first popup member 40 that resemble the table portion of a mitre saw in the depicted embodiment to extend beyond (to the left and right of) the left and right side segments 67 and 68, respectively, when first popup member 40 is in an extended position. Stock 100 is configured such that, in its assembled form of display 10 shown in FIG. 1, right side segment 68 extends away from side 26 of panel 22 and left side segment 67 extends away from side 30 of panel 18 when cover 12 of display 10 is in an open position, as shown in FIG. 1. Segment 61 also includes connection tab 63, and stock 100 is also configured such that the portion of connection tab 63 visible to the viewer in FIG. 3 can lay flat against and be coupled to side 30 of panel 18 when stock 100 is in its assembled form of display 10. Segment 61 also includes front facing segment 65, which is foldable (away from the viewer of FIG. 3) about fold line FL10 to span the space between left and right side segments 67 and 68 beneath the table portion of first popup member 40 when first popup member 40 is in an extended position. Front facing segment 65 includes a front facing segment connection tab 65*t*, foldable (away from the view of FIG. 3) about FL11, and stock 100 is also configured so that tab 65*t* can lay flat against and be coupled to the inside of left side segment 67 when stock 100 is in its assembled form of display 10. First popup member 40 includes a central fold line comprised of line segments 41*t* and 41*f*, about which first popup member folds 40 as cover 12 (shown in FIG. 1) transitions to a closed position. Specifically, stock 100 is configured such that the portion of first popup member 40 that defines central fold line segment 41*t* is positioned as far (or farther) from fold line 14 as any other portion of first popup member 40 when cover 12 is in a closed position, and the portion of first popup member 40 (which is a portion of front facing segment 65) that defines central fold line segment 41*f* is positioned as close (or closer) to bottom edge 8 of cover 12 as any other portion of first popup member 40 when cover 12 is in a closed position.

Stock 100 also includes segment 75, which is unitary with panel 18 and foldable about fold line FL12. Segment 75 is configured to be folded to form three-dimensional member 74 (shown in FIG. 1). Surface 75*s* of segment 75 has a graphical element printed on it that resembles the surface of a piece of wood (and, more specifically, lumber). When segment 75 is folded into three-dimensional member 74, three-dimensional member 74 resembles a piece of wood (and, more specifically, lumber). Surface 75*s* of segment 75 may also include (e.g., be printed with) one or more text elements, such as HAPPY HOLIDAYS (as shown in FIGS. 1 and 3), snowflakes (not shown), and/or other words and/or phrases. When stock 100 is in its assembled form as display 10, three-dimensional member 74's lumber shape is non-transitional, meaning it does not change from a relatively flat position to an extended position when cover 12 changes from a closed position to an open position. Segment 75 includes left side segment 71, which is bounded by fold lines FL13 and FL14. Segment 75 also includes right side segment 72, which is bounded by fold lines FL15 and FL16. Segment 75 also includes connection tab 73, and display 10 is also configured such that the portion of connection tab 73 visible to the viewer in FIG. 3 can lay flat against and be coupled to side 30 of panel 18 when stock 100 is in its assembled form as display 10. Member 74's three-dimensional configuration is a result of segment 75 including left and right side segments 71 and 72 and connection tab 73. Three-dimensional member 74 may be supported from underneath by a support structure such as foam, cardboard, or the like.

Other embodiments of the displays include one or more non-unitary popup and/or three-dimensional members, meaning the members are coupled to the cover but are not unitary with it. Such couplings may be achieved using any suitable attachment technique or material, such as an adhesive; a tape; a mechanical attachment, such as a tab, an interlocking part, hook and loop fasteners; and the like.

Unitary stock 100 may have printing, such as text and/or graphics, applied to it prior to being cut, or stock 100 may remain completely or partially unprinted until after it is cut and/or folded. Each of the segments of stock 100 may be printed on no surfaces or on one or more surfaces. In one embodiment of the displays, and as shown in FIGS. 1 and 3, stock 100, and thus display 10 created once stock 100 is assembled, contains one or more graphical and text elements; more specifically, display 10 includes multiple graphical elements and multiple text elements. For example, segment 61 (and first popup member 40 formed from segment 61) includes (e.g., is printed with) one or more graphical elements that depict at least the table portion of a mitre saw (and, more specifically, a sliding compound mitre saw). Each side of second popup member 50 includes (e.g., is printed with) one or more graphical elements that depict at least the blade, the blade housing, the guard, the handle, the slide bar, and the dust collector portions of a sliding compound mitre saw. The surfaces of the segments that comprise sides 30 and 26 of panels 18 and 22, respectively, of cover 12 include (e.g., are printed with) a wooden table or work bench surface. Furthermore, the portion of segment 64 visible to the viewer in FIG. 3 also includes (e.g., is printed with) multiple graphical elements that depict safety glasses, a hammer, and nails positioned on the wooden table or work bench surface. Side 30, as shown in FIG. 1, also includes (e.g., is printed with) one or more graphical elements that depict multiple nails. Graphical elements different from those shown and/or in addition to those shown may be included on one more surfaces of the foldable segments of one of the displays.

The fold lines, or fold paths, that are made in stock 100 are depicted in FIG. 3 as dashed lines. Fold paths used with the displays may be perforated, marked by printing, and/or marked by stamping or scoring, but need not be. Stock 100 may comprise a single layer of material, or multiple layers of material attached to each other in any way known in the art.

Assembling or constructing one of the displays according to some of the methods comprises forming (e.g., cutting or stamping) material into one or more shapes defining, or configured to be folded and/or coupled to another portion or other portions of the material to define, at least a folding member (e.g., member 12) and a first popup member (e.g., first popup member 40), each of which is a unitary portion of the material. The material may also be formed into one or more additional shapes that define, or are configured to be folded and/or coupled to another portion or other portions of the material to define, at least a second popup member (e.g., second popup member 50), which is a unitary portion of the material. The first popup member may include a partially bounded slot or cutout, or an opening, through which the second popup member may extend when the display resulting from the assembly of the material is in an open position. The material may also be formed into one or more additional shapes that define, or are configured to be folded and/or coupled to another portion or other portions of the material to define, at least a three-dimensional member (e.g., three-dimensional member 74), which can, in some embodiments, have a non-transitional shape and which is a unitary portion of the material. The material may also be formed to define a one or more windows or viewing panes. The material may also be formed to define one or more hanger(s), which may take the form of one or more partially bounded slots or cutouts or openings. In some embodiments of such methods, the material may be provided (e.g., perforated and/or scored) with one or more fold lines configured to enable portions of the material to be folded to form the recited shapes. In some embodiments of such methods, once the material is formed, it may be manipulated to form a display that includes the relevant members. For example, relevant portions of the material may be folded to define, at least partially, the display. Any connection tabs and/or other folded segments may be coupled to other respective portions of the material to assist in defining the display. The material may also be manipulated by using an adhesive or adhesives to secure such tabs and/or other folded segments, including by securing portions of the material to other portions of the material. In some embodiments of such methods that employ a non-unitary financial transaction card, the assembly of the display may also include the card coupled to one of the members (e.g., the first popup member) with an adhesive or the like. In some embodiments of such methods, the assembly of the display may also include one or more of an audio playback device, a sensor, and a power source coupled to some portion or portions of the material. These steps may be performed in different orders in different embodiments of some of the methods, and not all steps are performed in each embodiment.

Figure 4A:
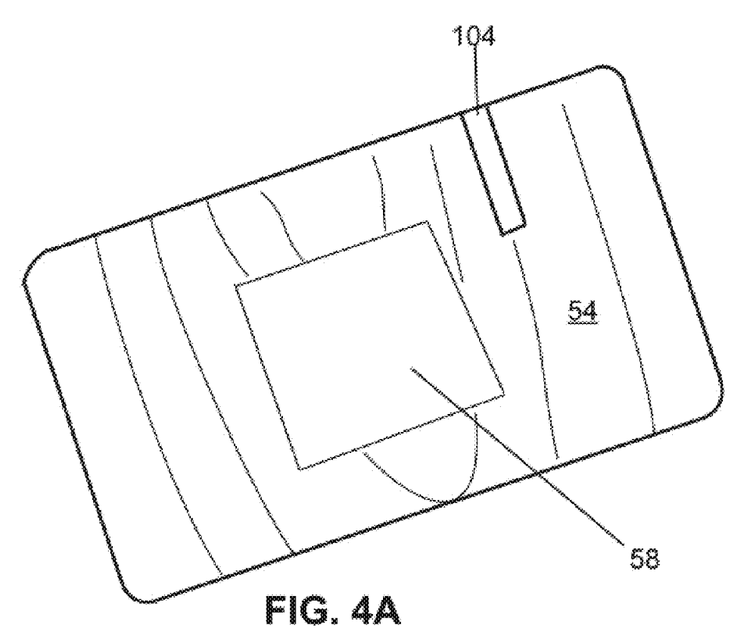
FIGS. 4A and 4B are front and rear views, respectively, of a financial transaction card shown in FIG. 1.
Figure 4B:
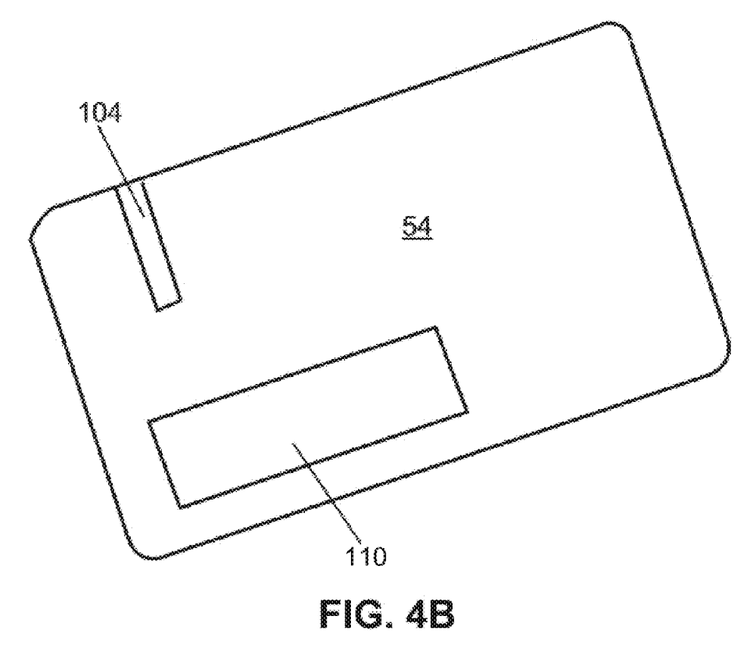

FIGS. 4A and 4B show both sides of financial transaction card 54, one embodiment of the financial transaction cards. As shown, card 54 may include (e.g., have printed thereon) a text or graphical element, such as brand identifier 58. The brand identifier may be on the front side of the card and may comprise a logo, a business name, a trademark, an image associated with the brand, a mascot, or any other indicia included for the purpose of indicating to a consumer the name of an entity associated with the card. The brand identifier may be in any location on either side of the card and may appear in any size proportionate to the card. Financial transaction card 54 may also comprise identifier 110, which may be on the back side of the card and may associate the card with a particular account, such as one based on money and/or credit, and/or a particular individual (e.g., customer). In some embodiments, identifier 110 comprises a bar code, a magnetic strip, a QR code, or any identifier sufficient to associate the card with a particular account and/or individual. In the depicted embodiment, card 54 comprises a transparent portion 104 that is designed to fit with the theme of the card and the display. Here, transparent portion 104 appears as if it is a partial mitre saw cut.

Figure 5:
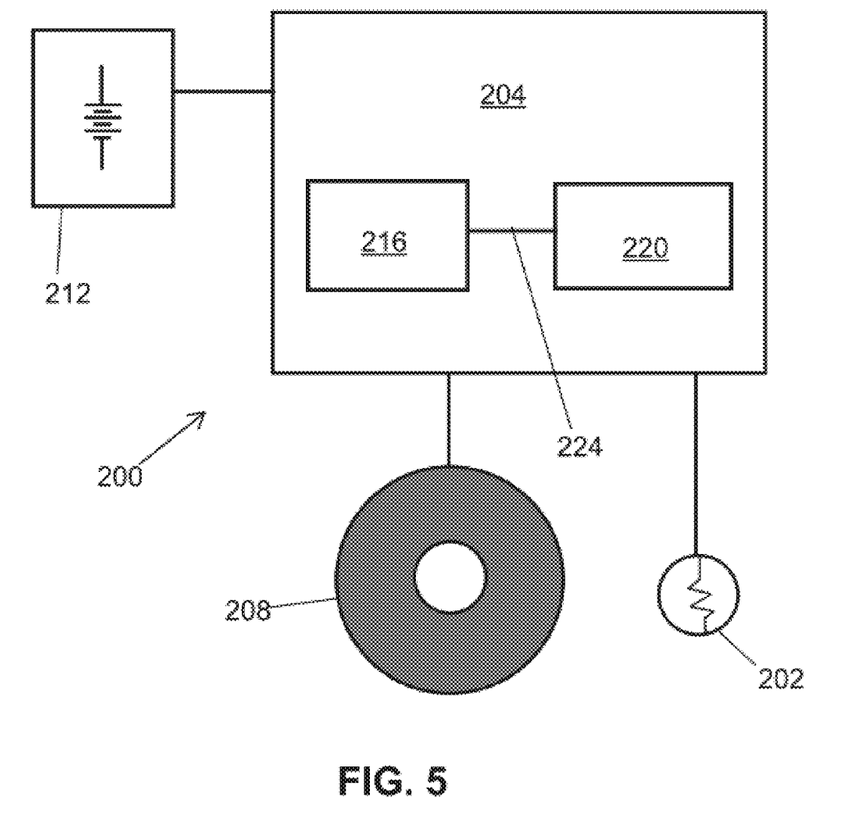
FIG. 5 is a block diagram of one embodiment of an audio playback system that may be used in conjunction with some embodiments of the displays.

FIG. 5 shows a block diagram of one embodiment of an audio playback device 200 and sensor 202 that may be included in some embodiments of the displays, such as display 10. Audio playback device 200 comprises computer 204, speaker 208, and power source 212. Computer 204 also comprises non-transitory computer memory 216 and central processing unit (CPU) 220 that is capable of executing computer instructions. CPU 220 is coupled to bus 224 that carries information between different modules or components within computer 204; memory 216 is also connected to bus 224. Memory 216 is used by CPU 220 to execute instructions and also contains information representing one or more pre-recorded audio segments, such as one or those that are consistent with a theme of the display. For example, the audio segment may play sounds that an actual mitre saw (or an actual version of some other item represented by the popup member or members of a given embodiment), such as, for example, in the form of a tune or song that is consistent with a desired theme or time of year. Finally, computer 204 includes input/output "IO" interfaces (not shown) that may be coupled to speaker 208 and sensor 202. In some embodiments, CPU 220 may be a device that executes software instructions, which may be stored on memory 216. Alternatively, CPU 220 may be hard-wired to perform functions that could otherwise be performed using software. For example, CPU 220 may be a microprocessor, a field programmable gate array (FPGA), or an application specific integrated circuit (ASIC) that is configured to execute functions without the use of external software.

In some embodiments of the displays that include an audio playback device, the audio playback device may be disposed underneath or within members or elements of the display such that at least a portion of the audio playback device is not visible during ordinary use of the display. For example, audio playback device 200 is disposed under three-dimensional member 74 in display 10 such that a portion of audio playback device 200 (such as computer 204, speaker 208, and/or power source 212) is substantially hidden when viewed at most angles.

Sensor 202 may comprise any number of sensors capable of sending a signal indicative of the transition of display 10, and more specifically cover 12, between open and closed positions. In some embodiments, sensor 202 comprises a photosensor; more particularly, sensor 202 comprises a photoresistor; even more particularly, sensor 202 comprises a cadmium sulfide cell or "CdS" photoresistor. Sensor 202 may be coupled to power source 212, as it is in audio playback device 200. In embodiments of the displays that include an audio playback device that includes a sensor comprising CdS photoresistor, the resistance of the photoresistor varies according to the intensity of the light incident on its face. When coupled to a power source (like power source 212), the photoresistor may send a signal comprising a varying voltage on one of its leads in response to incident light intensity changes resulting from the opening of the cover and, more generally, the display. To facilitate exposure of sensor 202 to incident light in such embodiments, display 10 includes an opening, such as cutout 203 shown in FIGS. 1 and 3.

Audio playback device 200, and more specifically processor 220, may be configured to access memory 216 to begin playing a pre-recorded audio sequence through speaker 208 when the signal that processor 220 receives from sensor 202 indicates a transition of cover 12 (and, more generally, display 10) from a closed position to an open position, or otherwise indicates cover 12 (and, more generally, display 10) is open. In some embodiments, processor 220 is configured to play the pre-recorded audio sequence once and then cease playing until processor 220 again receives a signal indicating cover 12 has transitioned a from a closed position to an open position. Processor 220 may also be configured to continue looping through the pre-recorded audio sequence until it receives a signal indicating cover 12 is in a closed position. In some embodiments, memory 216 may contain information representing multiple pre-recorded audio segments. Processor 220 may be configured to cycle through the multiple pre-recorded audio segments, or to select segments at random, each time processor 220 is configured to play a segment.

The above specification and examples provide a complete description of the structure and use of example embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the displays and methods are not intended to be limited to the particular forms disclosed. Rather, they include all modifications and alternatives falling within the scope of the claims, and embodiments other than the ones shown may include some or all of the features of the depicted embodiments. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A foldable financial transaction card display comprising:
    a folding member configured to fold about a fold line between an open position and a closed position;
    a first popup member unitary with at least a portion of the folding member and configured to transition between a collapsed position when the folding member is in the closed position and an extended position when the folding member is in the open position, the first popup member having an open region;
    a second popup member unitary with at least a portion of the folding member, the second popup member configured to transition between a collapsed position when the folding member is in a closed position and an extended position when the folding member is in the open position, the second popup member extending through the open region of the first popup member when the folding member is in the open position; and
    a financial transaction card removably coupled to the first popup member.

2. The foldable financial transaction card display of claim 1, where the financial transaction card is removably coupled to the first popup member such that when the first popup member is in its respective extended position and the second popup member is in its respective extended position, a pre-determined portion of the financial transaction card is in a specific position relative to a pre-determined portion of the second popup member.

3. The foldable financial transaction card display of claim 1, where the financial transaction card is removably coupled to the first popup member such that when the second popup member extends through the open region in the first popup member, a pre-determined portion of the financial transaction card is in a specific position relative to a pre-determined portion of the second popup member so as to create a synergistic effect between the pre-determined portions.

4. The foldable financial transaction card display of claim 1, configured such that the financial transaction card will be positioned between at least a portion of the second popup member and at least a portion of the first popup member when the second popup member is extended through the open region of the first popup member.

5. The foldable financial transaction card display of claim 1, configured such that the financial transaction card will be positioned between at least a portion of the first popup member and the folding member when the folding member is in the open position.

6. The foldable financial transaction card display of claim 1, further comprising:
    at least one display-supporting region coupled to the folding member and configured to support the display in a hanging position.

7. A foldable financial transaction card display comprising:
    a folding member configured to fold about a fold line between an open position and a closed position;
    a first popup member coupled to the folding member and configured to transition between a collapsed position when the folding member is in the closed position and an extended position when the folding member is in the open position;
    a second popup member coupled to the folding member, the second popup member configured to transition between a collapsed position when the folding member is in a closed position and an extended position when the folding member is in the open position; and
    a financial transaction card removably coupled to the first popup member;
    where the first popup member has an open region and the display is configured such that a top portion of the second popup member extends through the open region of the first popup member when the folding member is in the open position.

8. The foldable financial transaction card display of claim 7, where the financial transaction card is removably coupled to the first popup member such that when the first popup member is in its respective extended position and the second popup member is in its respective extended position, a pre-determined portion of the financial transaction card is in a specific position relative to a pre-determined portion of the second popup member.

9. The foldable financial transaction card display of claim 7, where the financial transaction card is removably coupled to the first popup member such that when the second popup member extends through the open region in the first popup member, a pre-determined portion of the financial transaction card is in a specific position relative to a pre-determined portion of the second popup member so as to create a synergistic effect between the pre-determined portions.

10. The foldable financial transaction card display of claim 7, further comprising:
    a sensor configured to send a signal indicative of a transition from the closed position to the open position; and
    an audio playback device coupled to the sensor, the audio playback device configured to play at least one pre-recorded audio segment in response to the signal.

11. The foldable financial transaction card display of claim 10, where:
    the audio playback device comprises:
        a speaker;
        a non-transitory computer memory containing at least one pre-recorded audio segment; and
        a processor coupled to both the speaker and the computer memory, the processor being configured to send signals representative of the pre-recorded audio segment to the speaker in response to the signal.

12. The foldable financial transaction card display of claim 10, further comprising:
    a three-dimensional member coupled to the folding member;
    where the audio playback device is positioned under at least a portion of the three-dimensional member.

13. The foldable financial transaction card display of claim 7, where:
    the folding member comprises:
        a first panel comprising:
            a first side; and
            a second side opposite the first side;
        a second panel coupled to the first panel and the fold line being between the first and second panels, the second panel comprising:
            a third side; and
            a fourth side opposite the third side;

the folding member being configured such that one of the first and second sides faces one of the third and fourth sides when the folding member is in the closed position; and the first popup member includes one portion that extends from the first panel and another portion that extends from the second panel when the first popup member is in the extended position.

* * * * *